United States Patent
Haberl et al.

(10) Patent No.: US 8,919,857 B2
(45) Date of Patent: Dec. 30, 2014

(54) CABRIOLET VEHICLE WITH ARTICULATED FRAME FLAPS AND SOFT TOP LOCK

(71) Applicant: Webasto-Edscha Cabrio GmbH, Stockdorf (DE)

(72) Inventors: Franz Haberl, Wallerfing (DE); Georg Kopp, Plattling (DE); Magnus Sviberg, Deggendorf (DE)

(73) Assignee: Webasto-Edscha Cabrio GmbH, Stockdorf (DE)

( * ) Notice: Subject to any disclaimer, the term of this patent is extended or adjusted under 35 U.S.C. 154(b) by 0 days.

(21) Appl. No.: 14/157,414

(22) Filed: Jan. 16, 2014

(65) Prior Publication Data

US 2014/0210229 A1    Jul. 31, 2014

(30) Foreign Application Priority Data

Jan. 29, 2013    (DE) .......................... 10 2013 100 868

(51) Int. Cl.
*B60J 7/00* (2006.01)
*B60J 7/02* (2006.01)
*B60J 7/20* (2006.01)

(52) U.S. Cl.
CPC . *B60J 7/028* (2013.01); *B60J 7/203* (2013.01)
USPC ................. 296/107.13; 296/107.09

(58) Field of Classification Search
USPC ......................... 296/107.13, 107.09
See application file for complete search history.

(56) References Cited

U.S. PATENT DOCUMENTS 2,289,173 A * 7/1942 Best .......................... 296/107.19
6,572,175 B2 * 6/2003 Schutt et al. .................. 296/108

FOREIGN PATENT DOCUMENTS

| DE | 102005028458 B4 | 10/2007 |
| DE | 102009006853 A1 | 8/2010 |
| DE | 102010008119 A1 | 8/2011 |

* cited by examiner

*Primary Examiner* — Lori L Lyjak
(74) *Attorney, Agent, or Firm* — Fitch, Even, Tabin & Flannery LLP (57) ABSTRACT

A cabriolet vehicle having an opening hood which is displaceable between a closed position spanning the interior of the vehicle, and a stowage position which opens up the top of the vehicle interior and which comprises a hood frame which comprises a frame arrangement on each side in relation to a vertical vehicle longitudinal center plane wherein the frame arrangement is mounted pivotally on a main bearing fixed on the vehicle at the rear end and in the closed position of the hood engages through a frame opening arranged in a vehicle edge area wherein the opening can be covered by means of a flap arrangement when the hood is in the stowage position, as well as a locking arrangement which secures the hood in its stowage position.

11 Claims, 13 Drawing Sheets

CABRIOLET VEHICLE WITH ARTICULATED FRAME FLAPS AND SOFT TOP LOCK

CROSS REFERENCE TO RELATED APPLICATIONS

This application claims benefit from Germany Application No. 10 2013 100 868.2, filed Jan. 29, 2013, which is hereby incorporated herein by reference in its entirety.

FIELD

The invention relates to a cabriolet vehicle having an opening hood which is displaceable between a closed positioning spanning the interior of the vehicle, and the stowage position which opens up the top of the vehicle interior and which comprises a hood frame having a frame arrangement on each side in relation to a vertical vehicle longitudinal center plane, and in particular to a cabriolet vehicle having articulated frame flaps and a soft top lock.

BACKGROUND

A cabriolet vehicle of this kind is known from practice and comprises an opening soft top hood which can be moved between a closed position spanning the interior of the vehicle and a stowage position which opens up the interior of the vehicle. In order to adjust the hood, a hood frame is provided which in the case of a so-called retractable hardtop (RHT) serves to support rigid roof segments or in the case of a folding soft top serves to tension a foldable hood cover. The hood frame comprises in both cases a system of rods which are arranged on each side in relation to a vertical vehicle longitudinal center plane and which are mounted for pivotal movement on a main bearing fixed on the vehicle at the rear end. In the closed position of the hood each relevant rod assembly engages through a frame opening arranged in the edge area of the vehicle. In the stowage position the hood frame is stowed in a hood stowage box at the rear of the vehicle. The frame openings are then each covered by means of an associated flap arrangement so that an optically aesthetic appearance is produced. The hood is moreover secured in its stowage position by means of a locking arrangement so that it cannot be undesirably moved. In order to actuate the flap arrangements and the locking arrangement, drives can be provided which are independent of one another. Furthermore the locking arrangement which secures the stowage position of the hood is mostly arranged centrally in the relevant vehicle and where applicable is provided with a manual button for actuation, wherein this button can be arranged in the center of the vehicle or also in a side trim in the rear passenger compartment of the relevant vehicle.

SUMMARY

The object of the invention is to provide a cabriolet vehicle of the type mentioned at the beginning which as far as the drive for the flap arrangements and locking arrangement is concerned is optimized compared with the prior art.

This is achieved according to the invention by the cabriolet vehicle having the features of patent claim 1.

The core of the invention consists in the locking arrangement and the flap arrangements being operable together, namely in that they are in active connection with one another by the coupling rod arrangement. Thus, separate drives for the flap arrangement and the locking arrangement can be omitted. Rather, these can be actuated by means of a common drive. Thus, one actuating process can be used on one of the flap arrangements or on the locking arrangement for actuating the other flap arrangement and the locking arrangement or both flap arrangements respectively. Thus, only one single drive means is required.

In a preferred embodiment of the cabriolet vehicle according to the invention, the coupling arrangement comprises a cable pull. A cable pull can be placed variably in a vehicle structure and can therefore be adapted in optimum manner to the structural space available in the relevant vehicle.

In a special embodiment of the cabriolet vehicle according to the invention, for actuating the flap arrangement and the locking arrangement by means of the cable pull, the flap arrangements and the locking arrangement are each provided with a cable pulley or cable roller which is engaged by a cable pull.

The cable pull is more expediently guided in cable guides in sections, more particularly in the areas arranged between the cable pulleys. In this case, the cable pull is thus designed as a so-called Bowden cable control in which a cable, more particularly designed as a wire cable, is guided in a sleeve which is stable in the running direction, that is the relevant cable guide.

In order to be able to keep the cable pull constantly taut, a special embodiment of the cabriolet vehicle according to the invention has for at least one of the cable guides a length compensating means, more particularly a length compensating spring, which serves for compensating length and/or tolerance. One end of the relevant cable guide is supported on the length compensating spring which is supported fixed on the vehicle by its end remote from this cable guide.

With an alternative embodiment of the cabriolet vehicle according to the invention the coupling arrangement comprises coupling rods which extend between the locking arrangement and the flap arrangements. In this case, the drive torques which are required for actuating the locking arrangement and the flap arrangement are thus transferred to each other arrangement via rigid elements designed as rods and/or links.

It is conceivable that the locking arrangement and the flap arrangement are actuated manually. In a preferred embodiment however an actuating device is provided which with corresponding activation triggers a displacement of the flap arrangements and the locking arrangement. The actuating device more particularly comprises a drive motor. This can be arranged in the region of one of the flap arrangements. The drive motor is preferably arranged however in the center of the vehicle on a base plinth of the locking arrangement so that a substantially symmetrical construction is provided as regards the locking arrangement and the flap arrangements. It is also conceivable that the actuating device is formed by closing springs with which the flap arrangements are provided so that an actuation of the flap arrangements triggered by the closing springs is transferred via the coupling arrangement to the locking arrangement for the actuation thereof.

In order in the case of a manually operable embodiment to prevent undesired opening of the flap arrangements during driving operation of the relevant vehicle, the flap arrangements are preferably each secured in their closing position by means of a snap hook. Rattling of the flap arrangements is thereby prevented.

In order to secure the closing position of the flap arrangements and the locked position of the locking arrangement, in a special embodiment of the cabriolet vehicle according to the invention, a drive link is provided which is associated with the locking arrangement and drives a bolt link which is pivotal between a locked position and a release position, wherein the drive link in the locked position of the bolt link occupies an over-dead-center position. Torques entering the drive link from the bolt link can thus not actuate the drive link in such a way that the bolt link would pivot into its release position. Rather any load is only passed in the direction of the locked position.

Further advantages and advantageous configurations of the object of the invention can to be drawn from the description, the drawing and the patent claims.

Embodiments of a cabriolet vehicle according to the invention are illustrated in simplified diagrammatic form in the drawings and will be explained in further detail in the following description.

DETAILED DESCRIPTION

Figure 1:
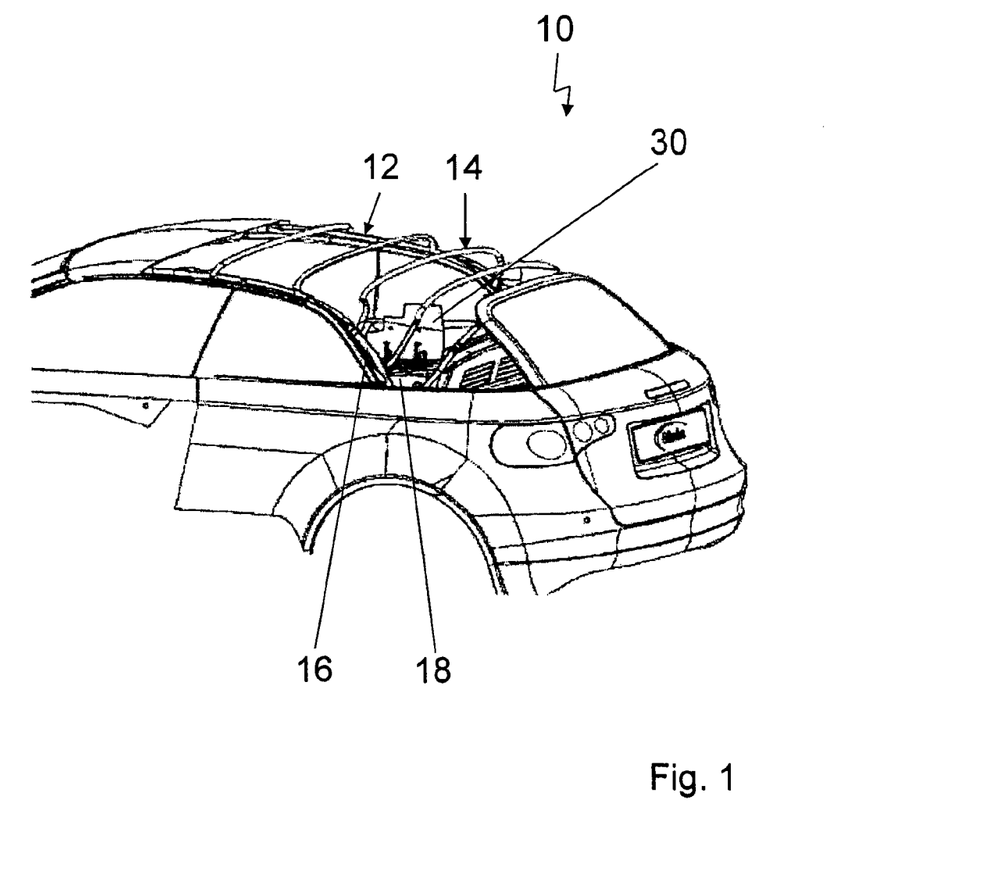
FIG. 1 shows a cabriolet vehicle with an opening hood in its closing position and with opened hood frame outlet flaps.
Figure 2:
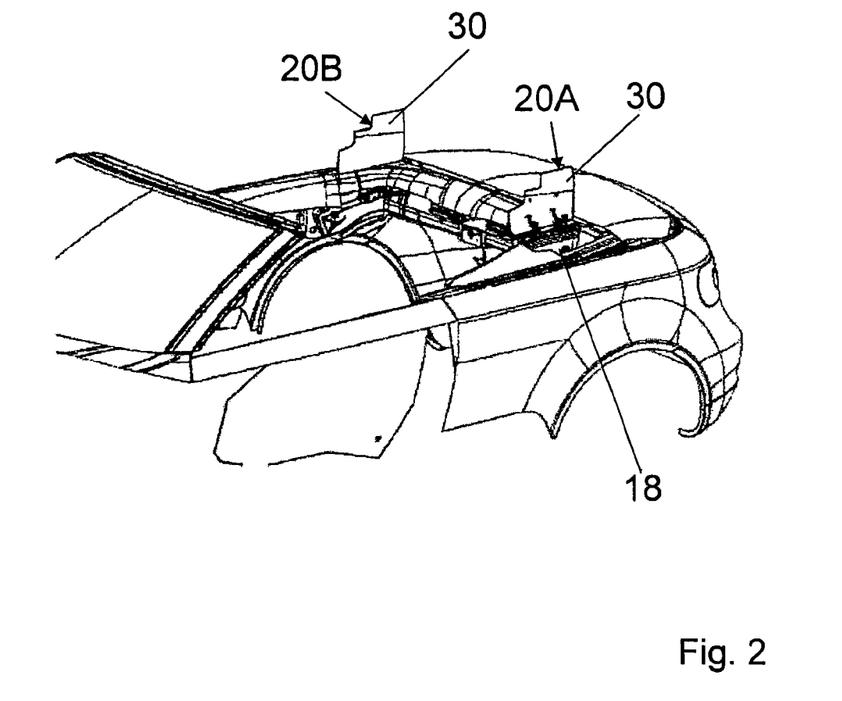
FIG. 2 shows the cabriolet vehicle according to FIG. 1 with the opened hood, but with opened frame outlet flaps.
Figure 3:
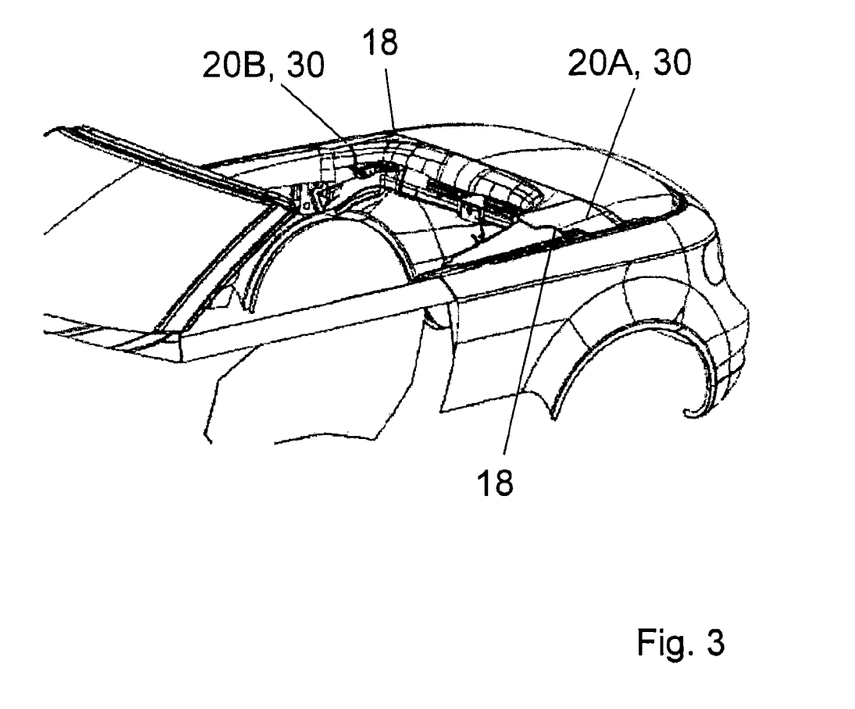
FIG. 3 is a view corresponding to FIG. 2, but with closed frame outlet flaps.
Figure 4:
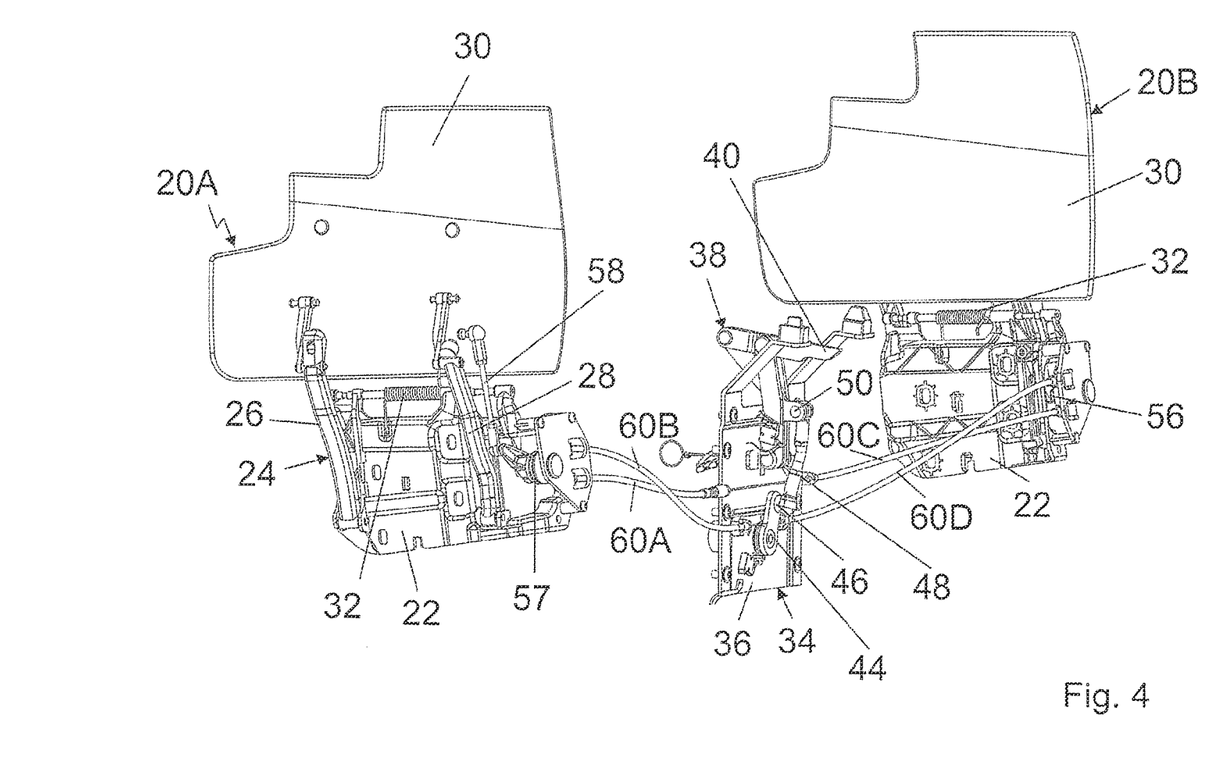
FIG. 4 shows the hood frame outlet flaps in the opened state together with a locking arrangement for the hood.
Figure 5:
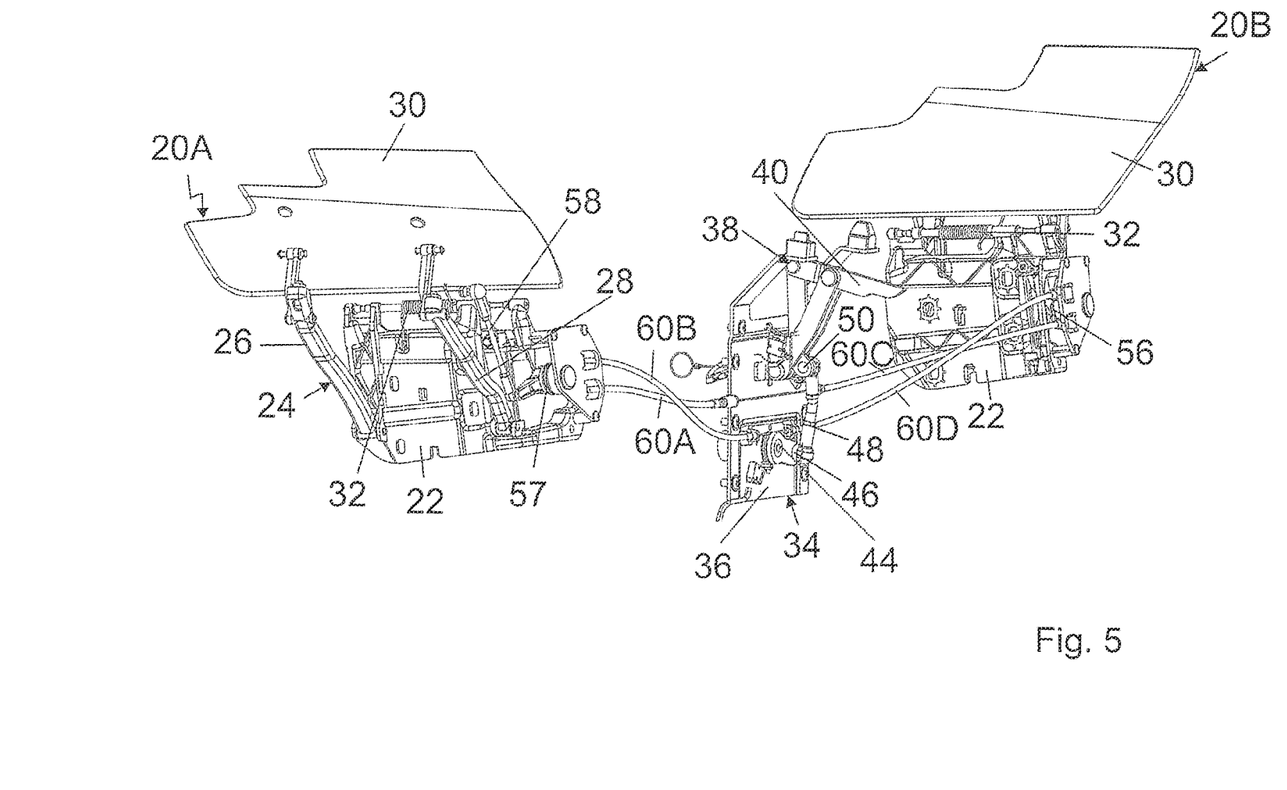
FIG. 5 is a view corresponding to FIG. 4, but with partially closed hood frame outlet flaps.

FIGS. 1 to 3 show a cabriolet vehicle 10 which is provided with a hood 12 which is designed as a convertible roof which is displaceable between a closed position illustrated in FIG. 1 and in which the interior of the vehicle is spanned, and a stowage position which opens up the top of the vehicle interior and which is shown in FIG. 2 and in which the hood 12 is stowed and secured in a hood stowage box at the rear end.

The hood 12 comprises a hood frame 14 which serves for tensioning a roof cover (not shown) and has on each side a frame arrangement 16 which is mounted for pivotal movement on a rear-side main bearing (likewise not shown) which is fixed on the vehicle. In the closed position of the hood which is shown in FIG. 1 the link arrangements 16 each engage through a frame opening 18 in the cabriolet vehicle 10 which is arranged at the side in the relevant bottom corner area. In the stowage position of the hood 12 shown in FIG. 3 the frame openings 18 are each closed by means of a flap arrangement 20A and 20B respectively.

The flap arrangements 20A and 20B each comprise a link unit 24 mounted pivotally on a base plinth 22 and having two links 26 and 28 each connected to a cover panel 30 which forms the actual closing element for the relevant frame opening 18. Furthermore the flap arrangements 20A and 20B each comprise a spring 32 which pretensions the relevant cover panel 30 into its position which releases the relevant frame opening 18.

Figure 6:
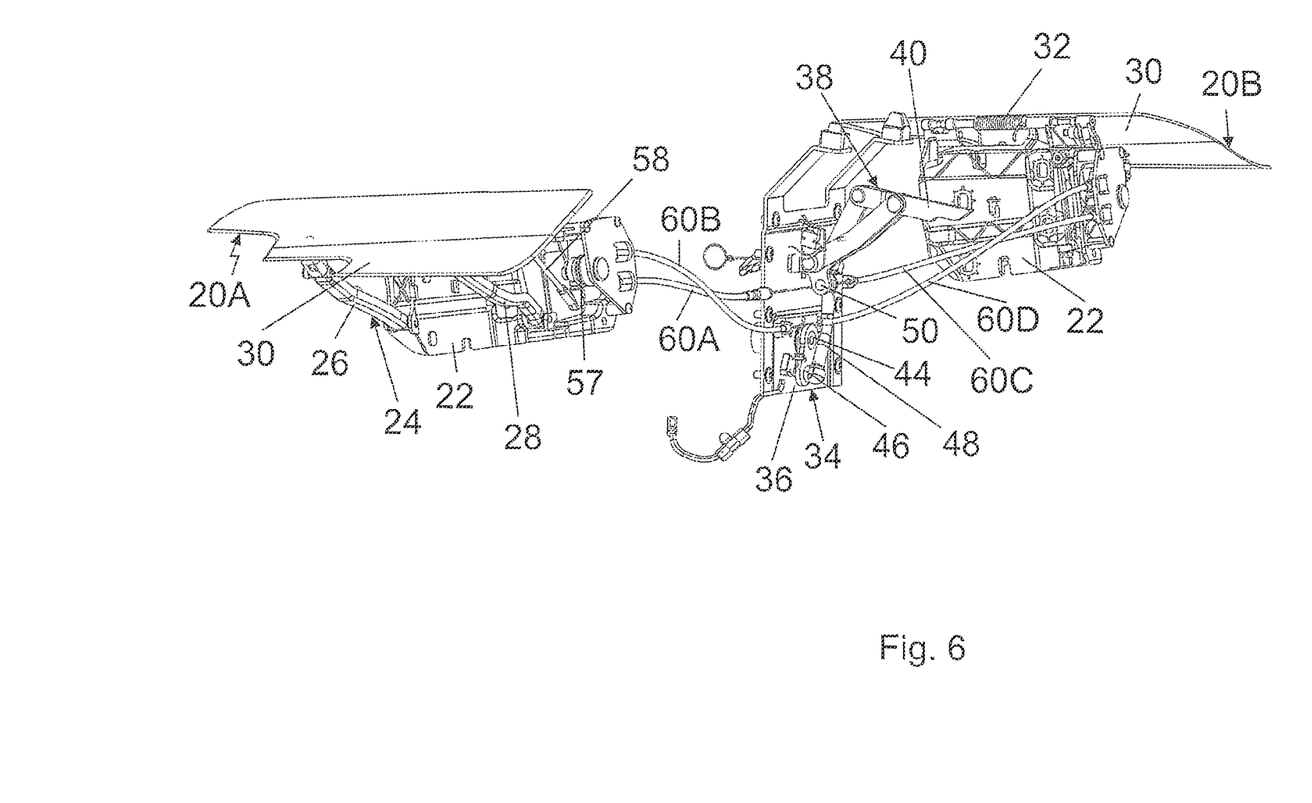
FIG. 6 is likewise a view corresponding to FIG. 4, but with closed hood frame outlet flaps.
Figure 7:
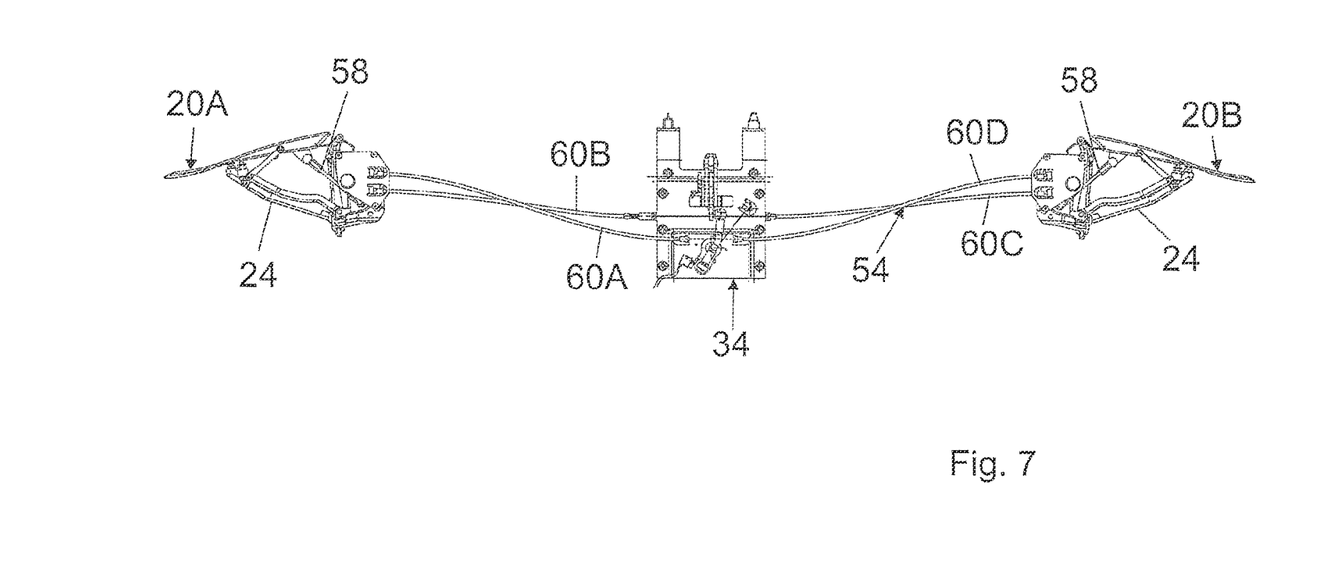
FIG. 7 is a rear view of the hood frame outlet flaps and the locking arrangement.

To secure the stowage position of the hood, the cabriolet vehicle furthermore has a locking arrangement 34 which is mounted in the center of the vehicle and has a bearing socket 36 which is joined to the vehicle structure. A linkage arrangement 38 is joined to the bearing socket 36 and has a hold-down member 40 which engages over the hood 12 in its stowage position (see FIG. 6).

To actuate the linkage arrangement 38 of the locking arrangement 34 the latter has a drive motor 42 which is mounted on the bearing socket 36 and which drives by way of a drive shaft a drive rod 44 which is connected by an articulated joint 46 to a bolt link 48 which in turn is connected by an articulated joint 50 to the linkage arrangement 38.

Figure 8:
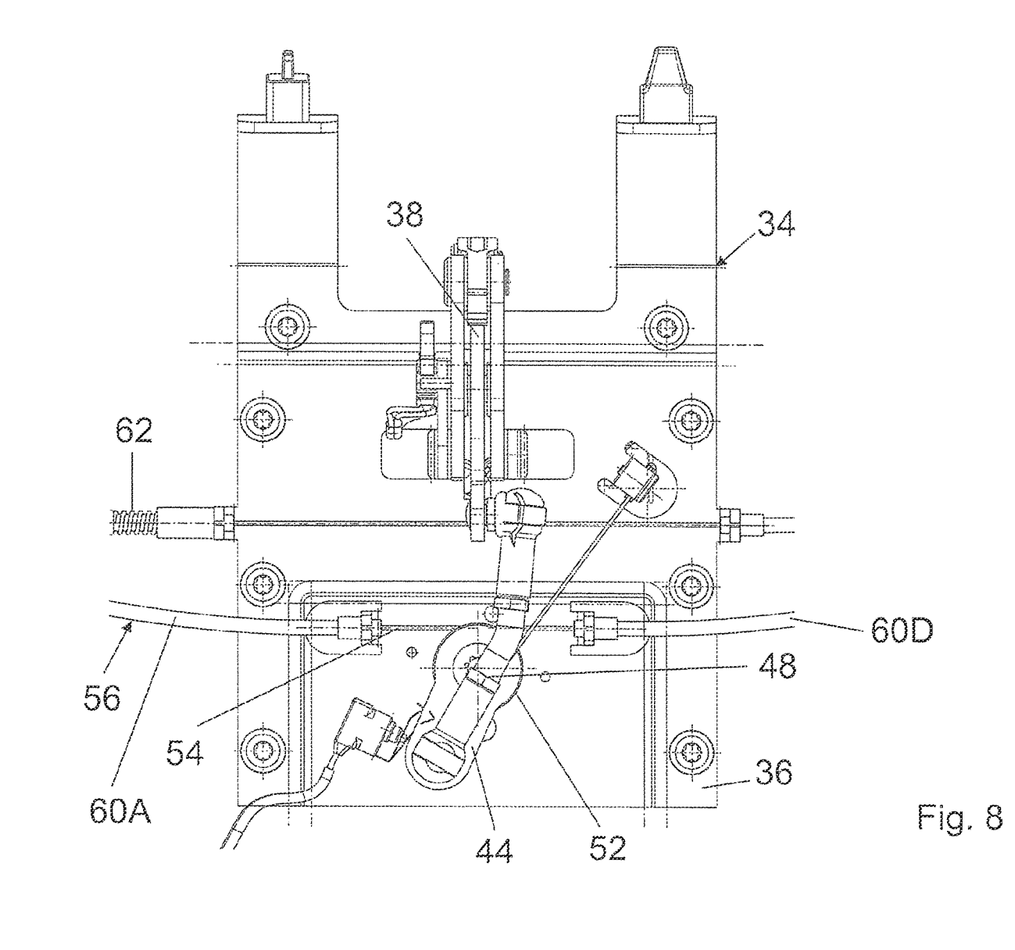
FIG. 8 is an enlarged view of a rear view of the locking arrangement.
Figure 9:
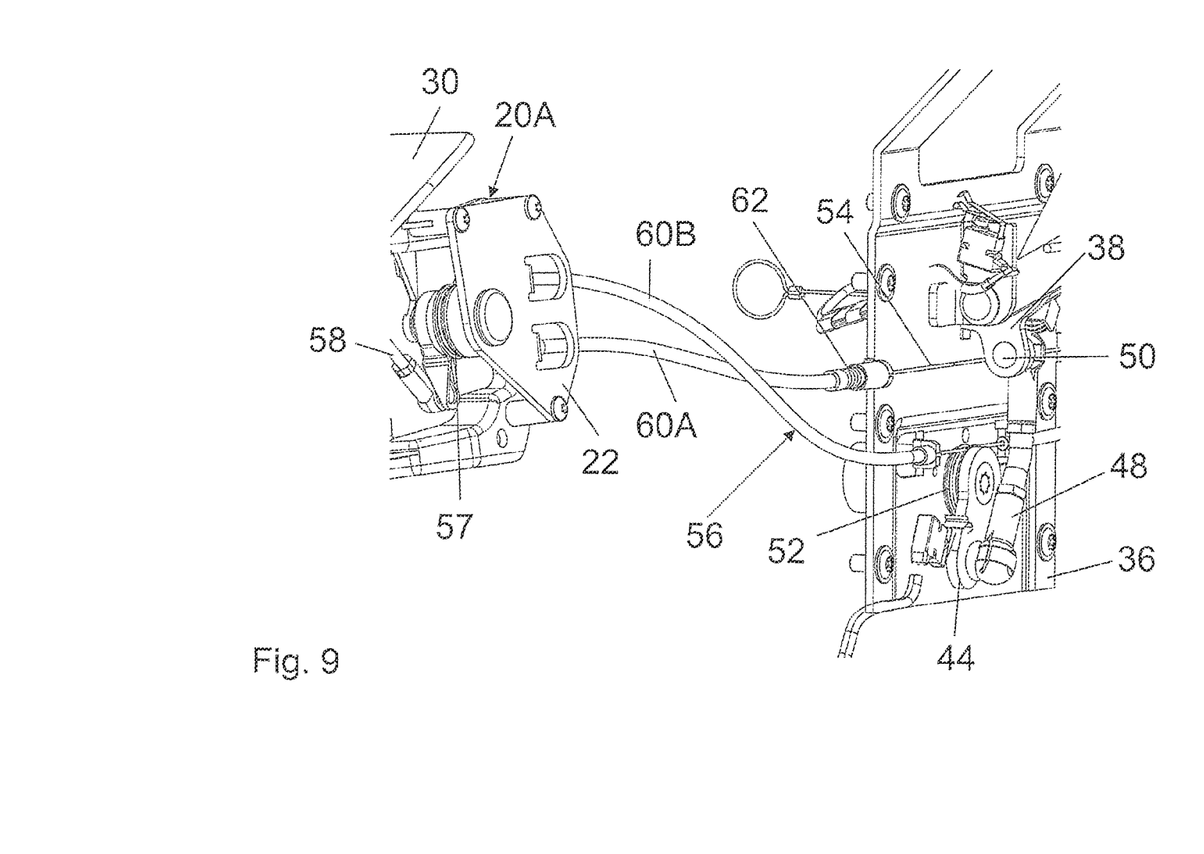
FIG. 9 is an enlarged partial view of a flap arrangement and the locking arrangement.
Figure 10:
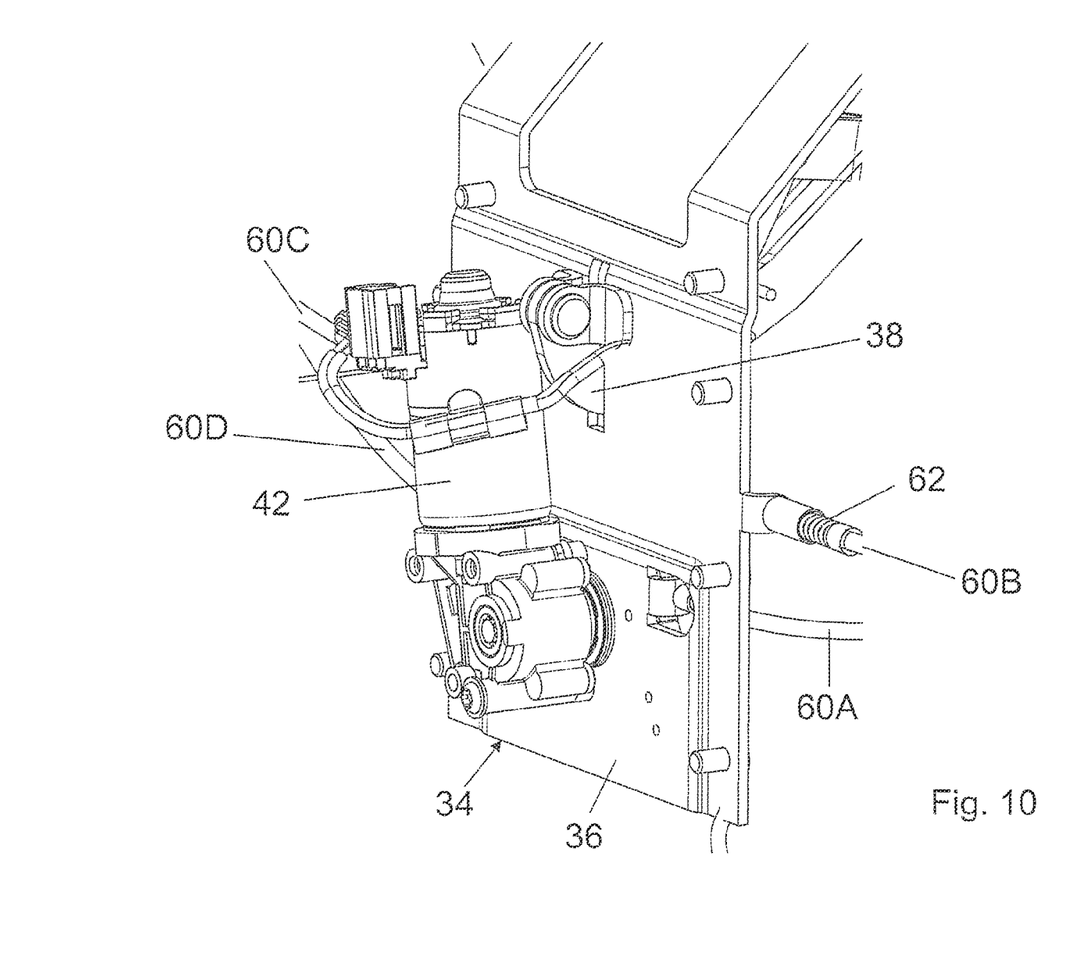
FIG. 10 shows a drive motor of the locking arrangement.

As can be seen from FIG. 8, which shows the locked position of the locking arrangement 34, the drive rod 44 occupies, in the locked position of the bolt link 48 in which the linkage arrangement 38 secures the hood 12 in its stowage position, an over-dead-center position so that forces which are introduced via the linkage arrangement 38 and the bolt link 48 into the drive rod 44 cannot lead to an opening movement of the linkage arrangement 38 for releasing the hood 12 but initiate a torque into the drive rod 44 acting in the locking direction.

For the coupled actuation of the locking arrangement 34 and the flap arrangements 20A and 20B the locking arrangement 34 has a cable pulley 52 which sits on the drive shaft of the drive motor 42 and which is engaged by a wire cable 54 of a Bowden cable control 56. The Bowden cable control 56 is guided on each side of the locking arrangement 34 to the relevant flap arrangement 20A and 20B respectively and is directed there round a cable pulley 57 which is connected to an actuating lever 58 for pivoting the cover panel 30 in the opening and closing positions. The cable pulleys 57 are each mounted rotatable in the region of the relevant socket 22 of the respective flap arrangement 20A and 20B respectively. The wire cable 54 is guided between the locking arrangement 34 and the flap arrangements 20A and 20B in two flexibly displaceable cable sleeves 60A and 60B, and 60C and 60D respectively. The locking arrangement 34 and the flap arrangements 20A and 20B are thus coupled to one another by way of the wire cable 54 which represents a coupling arrangement.

The cable sleeve 60B is supported via a spring element 62 on the socket 36 of the locking arrangement 34 so that it acts as a length compensating spring for compensating tolerances and the wire cable 54 always has sufficient tension for actuating the locking arrangement 34 and the flap arrangements 20A and 20B.

Figure 11:
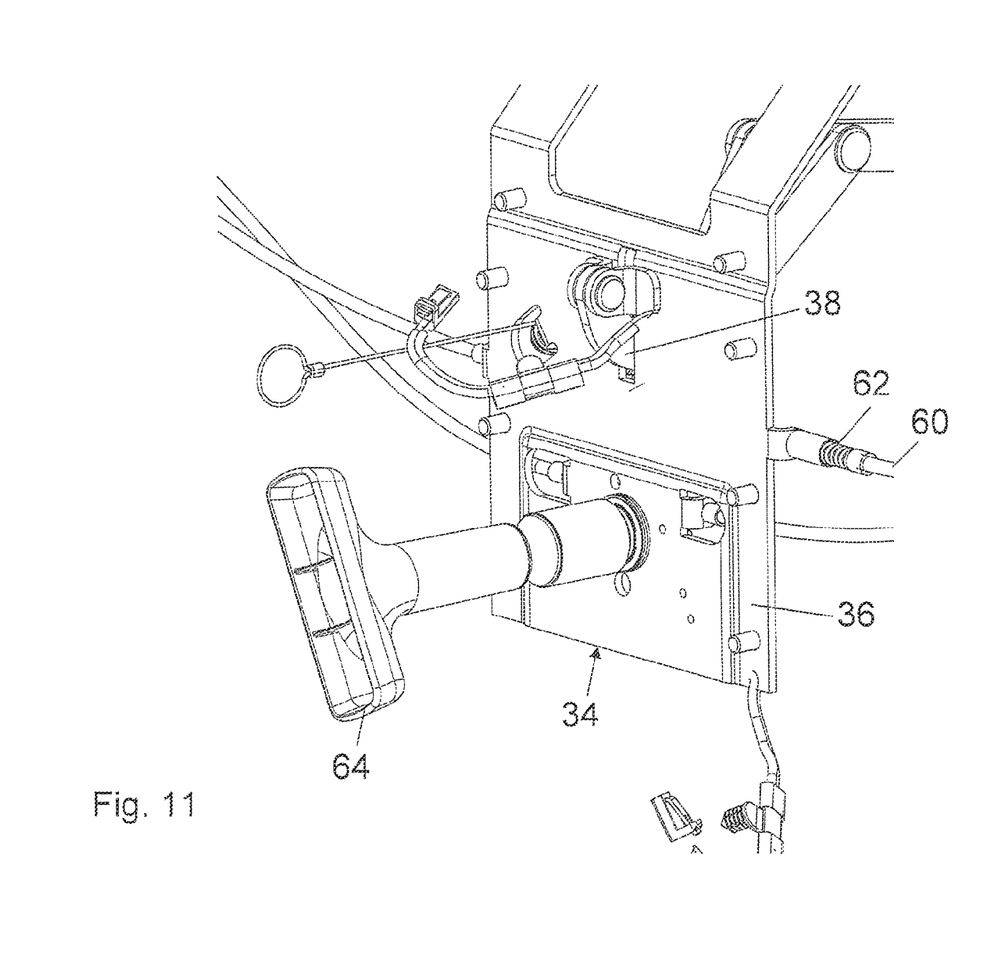
FIG. 11 shows an emergency operating lever for the locking arrangement.

In the event of a failure of the drive motor 42 this can be demounted so that an actuating handle 64 for manually actuating the flap arrangements 20A and 20B and the locking arrangement 34 can be fitted on the drive shaft which is connected to the drive rod 44 and the cable pulley 52 of the locking arrangement 34 (see FIG. 11). The actuating handle 64 can also in a corresponding design be the drive element of a manual embodiment with a manual central drive.

Figure 12:
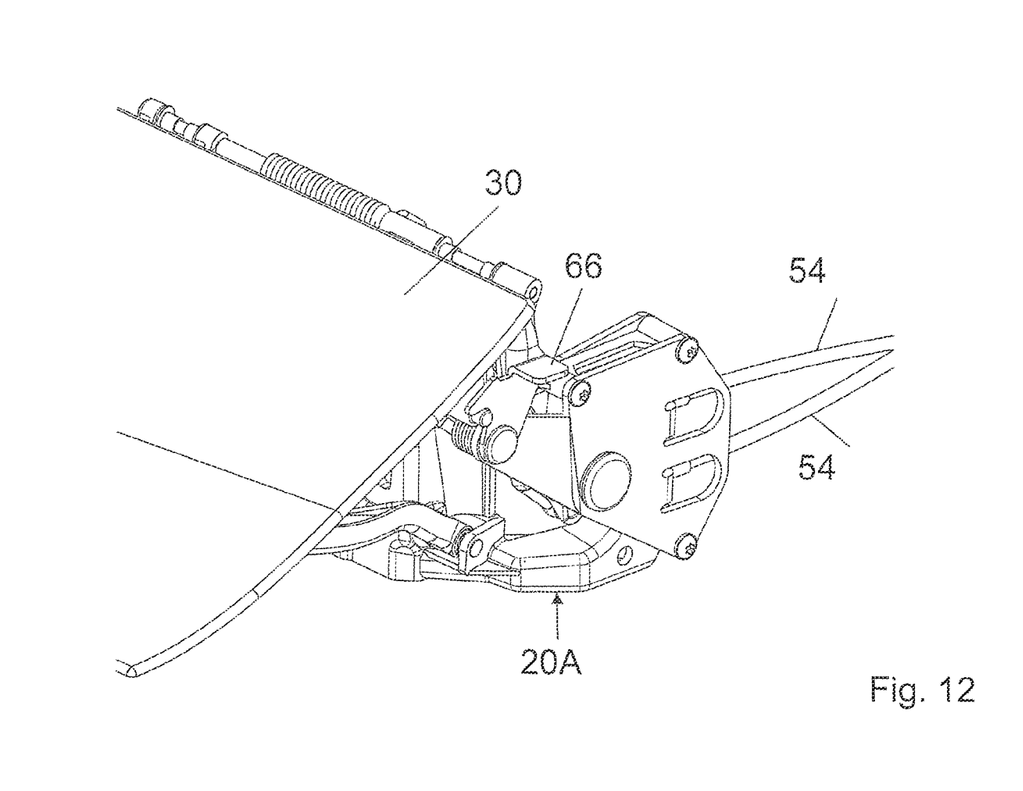
FIG. 12 shows a securing of the hood frame outlet flaps in the case of a manually operable embodiment.

In order to be able to prevent undesired opening through vibrations in the fascia panels 30 of the flap arrangements 20A and 20B the cover panels 30 in the case of the embodiment illustrated in FIG. 12 which is manually operable are secured by means of a snap hook 66 in their closed position which closes the relevant frame opening 18. In order to open the fascia panels 30 the snap hooks 66 must then each be pivoted into the release position through manual actuation.

Figure 13:
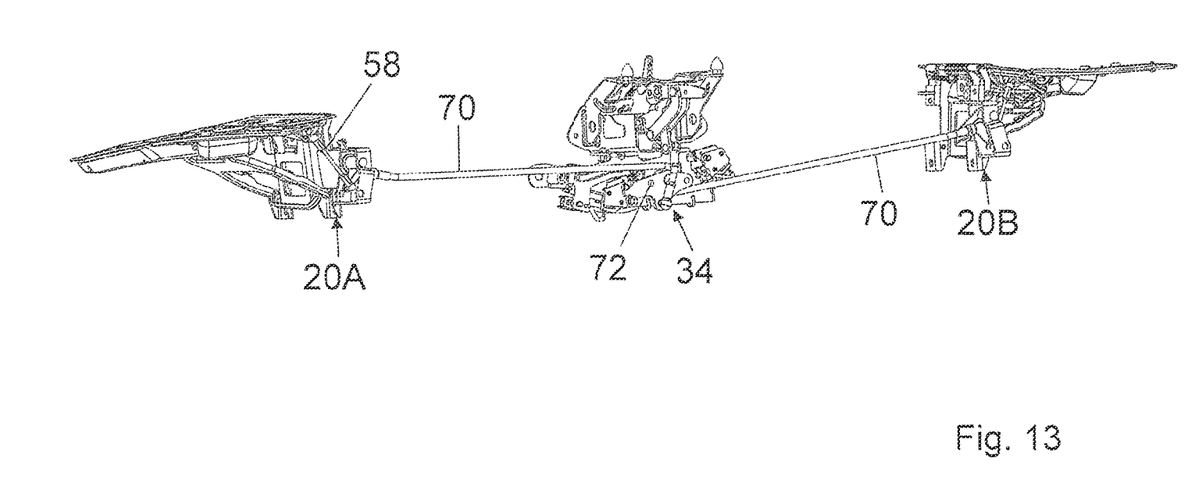
FIG. 13 shows an alternative embodiment of an arrangement of frame outlet flaps and a locking arrangement.

An alternative embodiment is illustrated in FIG. 13 of an arrangement of a locking arrangement 34 and laterally mounted flap arrangements 20A and 20B which corresponds substantially to the arrangement illustrated in FIGS. 4 to 11 of a locking arrangement and two flap arrangements, but differs from this however in that instead of a cable pulley as the coupling arrangement here coupling rods 70 are provided which are on one side attached for articulated movement on a rocker arm 72 of the locking arrangement 34 driven by means of a drive motor and on the other hand are connected by a corresponding articulation to an operating lever 58 of the relevant flap arrangement 20A and 20B respectively. A coupled drive of the locking arrangement 34 and the flap arrangements 20A and 20B via the coupling rods 70 is also possible.

The invention claimed is:

1. A cabriolet vehicle, comprising an opening hood which is displaceable between a closed position spanning the interior of the vehicle, and a stowage position which opens up the top of the vehicle interior and which comprises a hood frame which comprises a frame arrangement on each side in relation to a vertical vehicle longitudinal center plane wherein the frame arrangement is mounted pivotally on a main bearing fixed on the vehicle at the rear and in the closed position of the hood engages through a frame opening arranged in a vehicle edge area wherein the frame opening can be covered by means of a flap arrangement when the hood is in the stowage position, as well as a locking arrangement which secures the hood in a hood stowage position, wherein the locking arrangement is connected by way of a coupling arrangement to the flap arrangements which are arranged on each side so that an actuation of the locking arrangement triggers an actuation of the flap arrangements or an actuation of one of the flap arrangements triggers an actuation of the other flap arrangement and the locking arrangement.

2. The cabriolet vehicle as claimed in claim 1 wherein the coupling arrangement comprises a cable pull.

3. The cabriolet vehicle as claimed in claim 2 wherein the flap arrangement and the locking arrangement are each provided with a cable pulley or a cable roller which is engaged by the cable pull.

4. The cabriolet vehicle as claimed in claim 2 wherein the cable pull is guided in sections in cable guides.

5. The cabriolet vehicle as claimed in claim 4 wherein at least one of the cable guides is provided with a length compensating means, more particularly with a length compensating spring.

6. The cabriolet vehicle as claimed in claim 1 wherein the coupling arrangement comprises coupling rods which extend between the locking arrangement and the flap arrangements.

7. The cabriolet vehicle as claimed in claim 1 which comprises an actuating device.

8. The cabriolet vehicle as claimed in claim 7 wherein the actuating device comprises a drive motor which is preferably arranged on a socket base of the locking arrangement.

9. The cabriolet vehicle as claimed in claim 1 wherein the flap arrangements each comprise a linkage unit to which a cover panel is joined which in the stowage position of the hood covers the relevant frame opening wherein the linkage unit is driven by means of the coupling arrangement.

10. The cabriolet vehicle as claimed in claim 1 wherein the flap arrangements are each secured in their closing position by means of a snap hook.

11. The cabriolet vehicle as claimed in claim 1 wherein the locking arrangement comprises a drive rod which drives a bolt link pivotal between a locking position and a release position and which in the locking position of the bolt link occupies an over-dead-center position.

* * * * *